(12) United States Patent
Okubo et al.

(10) Patent No.: US 6,176,806 B1
(45) Date of Patent: Jan. 23, 2001

(54) CAM DISK FOR TOROIDAL TYPE CONTINUOUSLY VARIABLE TRANSMISSION

(75) Inventors: Kiyoshi Okubo, Maebashi; Hiroyuki Itoh, Fujisawa; Nobuaki Mitamura, Fujisawa; Nobuo Goto, Fujisawa; Makoto Fujinami, Fujisawa; Hiroshi Kato, Fujisawa; Takashi Imanishi, Fujisawa, all of (JP)

(73) Assignee: NSK Ltd., Tokyo (JP)

( * ) Notice: Under 35 U.S.C. 154(b), the term of this patent shall be extended for 0 days.

(21) Appl. No.: 09/349,204

(22) Filed: Jul. 7, 1999

(51) Int. Cl.[7] .................................................... F16H 55/32
(52) U.S. Cl. ............................................... 476/73; 476/42
(58) Field of Search ................................... 476/73, 40, 42

(56) References Cited

U.S. PATENT DOCUMENTS 5,669,274   9/1997   Yokoi et al. .
5,976,053 * 11/1999  Kino et al. ............................. 476/73

FOREIGN PATENT DOCUMENTS

| 4431007A1 | 3/1995 | (DE) . |
| 19829631 | 2/1999 | (DE) . |
| 08066738A | 3/1996 | (JP) . |
| 08066739A | 3/1996 | (JP) . |
| 9-126289 | 5/1997 | (JP) . |
| 9-126290 | 5/1997 | (JP) . |

* cited by examiner

Primary Examiner—Dirk Wright
(74) Attorney, Agent, or Firm—Christensen O'Connor Johnson Kindness PLLC

(57) ABSTRACT

A cam disk for use in a loading cam mechanism of a toroidal type continuously variable transmission comprises a first projecting portion, a second projecting portion, a flange portion, a cam surface, a bearing raceway and a corner section. The cam disk has metal flows along the cam surface, metal flows along a surface of the raceway, and metal flows along a surface of the corner section. To produce the cam disk, material is shaped into a predetermined form through a first forging step using a first die unit, a second forging step using a second die unit, a third forging step using a third die unit, a finishing step, etc. The metal flows are also formed in these steps.

6 Claims, 11 Drawing Sheets

CAM DISK FOR TOROIDAL TYPE CONTINUOUSLY VARIABLE TRANSMISSION

BACKGROUND OF THE INVENTION

The present invention relates to a cam disk for a toroidal type continuously variable transmission used as a transmission of a vehicle such as an automobile.

Conventionally, a stage transmission which comprises speed change gears is used as a transmission of an automobile. This type of transmission has a plurality of gears. The combination of gears is changed to transmit torque from an input shaft to an output shaft at a desired transmission ratio. In the conventional transmission, torque is changed stage by stage, when the speed is changed. Thus, the conventional transmission is disadvantageous in that the power transmission efficiency is low and that vibration occurs when the speed is changed. To overcome these disadvantages, in recent years, a continuously variable transmission is put to practical use. With the continuously variable transmission, no vibration occurs when the speed is changed. In addition, since the power transmission efficiency is higher than that of the aforementioned conventional transmission, the fuel efficiency of the engine is improved.

As an example of the continuously variable transmissions, conventionally, a toroidal type continuously variable transmission 120 as shown in FIG. 14 has been proposed. This type of transmission comprises an input disk 102, an output disk 103a, power rollers 103b rotationally in contact with the disks 102 and 103a, a loading cam mechanism 106, etc. The input disk 102 is rotated in association with the input shaft 101. The input shaft 101 is connected to a drive shaft 122 rotated by an engine serving as a power source. The output disk 103a is rotated in association with an output shaft (not shown). The loading cam mechanism 106 presses the input disk 102 and the output disk 103a in such directions that the disks get closer to each other.

A toroidal type continuously variable transmission with a single cavity comprises a pair of an input disk 102 and an output disk 103a. A toroidal type continuously variable transmission with double cavities comprises two pairs of input disks 102 and output disks 103a. FIG. 14 shows a part of a double-cavity toroidal type continuously variable transmission 120. The transmission 120 has a first cavity 108 including first input and output disks 102 and 103a and power rollers 103b, and a second cavity including second input and output disks and power rollers (not shown). The loading cam mechanism 106 is provided, for example, on the side of a power source for driving the input disk 102 of the first cavity 108. The loading cam mechanism 106 has a cam disk 104 and a roller 105 serving as pressing means. The cam disk 104 is rotatably supported by an input shaft 101 via a ball 125. The roller 105 is rotatable between the cam disk 104 and the input disk 102 about an axis M1 crossing an axis P1 of the input shaft 101. The input disk 102 is pressed against the output disk 103a via the roller 105.

The cam disk 104 shown in FIG. 14 integrally comprises a first projecting portion 112, a second projecting portion 113, a flange portion 114 and a cam surface 115. The first and second projecting portions 112 and 113 are projected from a central portion of the disk 104 in both axial directions of the disk 104. The thickness of the flange portion 114 is gradually reduced from the first projecting portion 112 toward the peripheral portion. The roller 105 is brought into contact with the cam surface 115. In the central portion of the cam disk 104, a fitting hole 116 is formed, through which the input shaft 101 is inserted. A continuous raceway 117 is formed in the overall inner circumference of the fitting hole 116. A continuous raceway 118 is formed in the overall outer circumference of the input shaft 101. The raceways 117 and 118 have arc-shaped cross sections corresponding to the outer diameter of the ball 125.

A line segment N1 connecting bottoms 117a and 118b of the raceways 117 and 118 is inclined with respect to the axis P1 of the input shaft 101. When the first input disk 102 is pressed by the roller 105 in the direction toward the first output disk 103a, the counterforce is applied to the input shaft 101 via the ball 125, thereby pressing the input shaft 101 toward the power source. As a result, the second input disk (not shown) is pressed toward the second output disk. The input shaft 101 and the cam disk 104 are rotatable with respect to each other via the ball 125 rotatably held between the raceways 117 and 118.

The cam disk 104 comprises teeth 112a formed integral with an end portion of the first projecting portion 112. The teeth 112a mesh with teeth 122a formed in the drive shaft 122, so that the cam disk 104 is rotated together with the drive shaft 122. In other words, the rotation of the drive shaft 122 is transmitted to the cam disk 104 via the teeth 112a and 122a. As a result, the first input disk 102 and the second input disk are rotated. The rotation of the first input disk 102 is transmitted to the first output disk 103a via the first power roller 103b. The rotation of the second input disk is transmitted to the second output disk via the second power roller. As a result, the output axis is rotated.

The toroidal type continuously variable transmission 120 can transmit higher torque than the conventional belt type continuously variable transmission described above. However, considerable compressive stress and tensile stress act on the cam disk 104. More specifically, when the input disk 102 is pressed toward the output disk 103a by the roller 105, much greater compressive stress and tensile stress act on the cam disk 104 as compared to the case of a general mechanical member on which stress is exerted repeatedly, such as, a gear or a bearing.

Particularly in regions enclosed by the dot-chain lines H1 in FIG. 14, considerable compressive stress acts on the cam surface 115 and the raceway 117. Further, the outer circumference of the flange portion 114 of the cam disk 104 is warped away from the input disk 102 by the counterforce applied to the cam disk 104 when the roller 105 press the input disk 105 toward the output disk 103a. For this reason, great tensile stress acts on a region enclosed by the dot-chain line H2 in FIG. 14, i.e., a corner section 119 where the second projecting portion 113 intersects the cam surface 115. In the teeth 112a which mesh with the teeth 122a of the drive shaft 122, great compressive stress acts on a top end portion of the teeth 112a enclosed by the dot-chain line H3 in FIG. 14. Great tensile stress also acts on a root portion of the teeth 112a enclosed by the dot-chain line H4.

Conventionally, in one method for producing the cam disk 104 described above, a solid material 126 as shown in FIG. 15 or a hollow material is cut-worked. The material 126 is shaped into a column by, for example, rolling. In another method, the material is shaped into a form approximate to the cam disk 104 by forging, and subjected to the finishing process, such as grinding. In the method of producing the cam disk 104 by a cutting process from the material, the production yield is very low and a considerable period of time is required for the process. As a result, the production cost is increased.

The material 126, shaped through the steps of melting, casting and rolling, may contain a relatively much impurities in a portion 126a, 30% or less of the diameter of the material from the center. Further, the material 126, which has been subjected to plastic working such as rolling, has metal flows G formed along the axis I of the material 126. A metal flow means a line of texture formed in the metal when crystal grains are aligned in a direction during the process of plastically working the metal texture. The metal flow is also called a flow line. The texture obtained by a preferred orientation of the crystal grains is called deformation texture or fiber texture. Such texture has anisotropy and different mechanical properties depending on directions.

When the material 126 having the metal flows G as shown in FIG. 15 is cut-worked, thereby producing the cam disk 104 as shown in FIG. 16, metal flows G1 are formed along an axis I1 of the cam disk 104. In this case, the metal flows G1 are interrupted by the cam surface 115, the surface of the corner section 119, the surface of the raceway 117, etc., and so-called end flows E are formed. The angle θ10 between the cam surface 115 and the metal flows G1 is as large as, for example, 90°. The angle θ11 between the tangent of the raceway 117 and the metal flow G1 is as large as, for example, 30° or larger. Moreover, the central portion 126a of the material 126, containing a relatively great deal of impurities, may be exposed on the surface of the raceway 117.

Thus, in the cam disk 104 produced mainly by the cut-work process, a great deal of impurities may be contained or the end flows E may exist in the cam surface 115 and the surfaces of the raceway 117 and the corner section 119, on which much stress is exerted. In this case, the cam disk 104 is liable to break along the metal flows G1. This results in reduction in lifetime of the cam disk 104 and the toroidal type continuously variable transmission having the cam disk 104.

On the other hand, the material (work) 126 may be first shaped into a form approximate to the cam disk 104 by die forging and the n subjected to a cutting process. In this method, since only one kind of die is used, the metal flows cannot be formed along the cam surface 115 or the surfaces of the corner section 119 and the raceway 117. As a result, end flows a re formed on these surfaces. Moreover, the central portion 126a of the material 126, containing a relatively great deal of impurities, may be exposed on the cam surface 115 and the surfaces of the corner section 119 and the raceway 117. Therefore, the cam disk 104 formed by this method also tends to have a short lifetime. In addition, according to this method, the die used in forging is in contact with the work for a long period of time. For this reason, since the die is influenced by high heat generated during the forging process, the surface hardness of the die is lowered and the lifetime of the die is liable to be shortened. Further, in the case where the work (material 126) is shaped into a form approximate to the cam disk 104 by die forging, the conventional die does not have a structure for holding the work. Therefore, the work is easily displaced from the center of the die, with the result that the work accuracy may be lowered.

When die forging is performed with one kind of die, underfill, burr or flash is liable to occur in a corner inside the die. Therefore, it is difficult to shape the material to a desired form. To shape the material 126 to a form approximate to the cam disk 104 in one forging process, a high pressure is required. However, if an excessive pressure is applied, the die may be damaged. Further, to reduce the margin for cutting the work in a cutting process after the forging process, it is necessary to reduce wear of the die. Thus, in the method where first the material is shaped into a form approximate to the cam disk 104 by one die forging process and then subjected to a cutting process, the lifetime of the die may be reduced and the production cost may be increased.

In the double-cavity half toroidal type continuously variable transmission 120 described above, if the transmission torque of the first cavity 108 and the transmission torque of the second cavity are different, simultaneity in changing the speed of the two cavities may be adversely influenced. In addition, if the transmission torques of the cavities are different, one of the cavities must transmit torque greater than the design value. In this case, slippage occurs on contact surfaces between the power roller 103b and the disks 102 and 103a. For these reasons, it is desirable that the transmission torques of the first cavity 108 and the second cavity be equal so far as possible.

The cam disk 104 produced by the conventional method as described above has end flows on the surface of the raceway 117. Therefore, when the ball 125 is rotated while it is in contact with the surface of the raceway 117 at a high pressure, flaking easily occurs on the surface of the raceway 117. When flaking occurs, the friction between the ball 125 and the raceway 117 is increased. When the friction between the ball 125 and the raceway 117 is increased, the first input disk 102 is liable to rotate along with the cam disk 104. As a result, the transmission torques of the first cavity 108 and the second cavity become different, which is not preferable for the reason described above.

Further, in the teeth 112a, as described above, considerable compressive stress acts at the distal end portion and considerable tensile stress acts on the root portion. Therefore, the teeth 112a tend to break along the metal flows, resulting in reduction in lifetime of the cam disk 104.

BRIEF SUMMARY OF THE INVENTION

It is accordingly an object of the present invention to provide a cam disk for a toroidal type continuously variable transmission which has a long lifetime and can be produced at a low cost.

To achieve the above object, according to the present invention, there is provided a cam disk for use in a toroidal type continuously variable transmission comprising: an input disk rotatable in association with an input shaft rotated by a drive source; an output disk facing the input disk; a power roller tiltably provided between the disks and rotatably in contact with the disks; and a loading cam mechanism for pressing the input or output disk in a direction that the input and output disks get closer to each other, wherein the loading cam mechanism comprises: a cam disk including a cam surface which faces the input disk; and a pressing member provided between the cam surface and the input disk, the cam disk having metal flows in its inside along the cam surface.

In this specification, it is defined that a metal flow runs along the cam surface, if the angle between the cam surface and the metal flows is 30° or smaller. In the cam disk according to the present invention, end flows are not easily formed in the cam surface. Therefore, the lifetime of the cam disk is longer than that of the conventional cam disk in which metal flows are formed along the axis of the cam disk. Accordingly, the toroidal type continuously variable transmission having the cam disk also has a long lifetime. Since the cam disk of the present invention is shaped mainly by forging, the yield is improved and can be produced at a low production cost.

The present invention includes the feature that a cam disk for use in a toroidal type continuously variable transmission comprises rolling elements such as balls which are contained between the input shaft and the cam disk and raceways for storing the rolling elements, wherein the cam disk has metal flows running along the raceways. In this specification, it is defined that a metal flow runs along the surface of a raceway, if the angle between the surface of the raceway and the metal flows is 30° or smaller. In the cam disk according to the present invention, end flows are not easily formed in the surfaces of the raceways. Therefore, even if the rolling elements are in contact with the raceway of the cam disk at high pressure, the surfaces of the raceway are not easily damaged. Thus, the lifetime of the cam disk is longer than that of the conventional cam disk in which metal flows are formed along the axis of the cam disk.

The present invention further includes the feature that the cam disk comprises the cam surface and a projecting portion extending along the axis of the cam disk in a central portion thereof, wherein the cam disk has metal flows running along the surface of a corner section where the projecting portion and the cam surface intersect. In this specification, it is defined that a metal flow runs along the surface of the corner section, if the angle between the surface of the corner section and the metal flows is 30° or smaller. In the cam disk according to the present invention, end flows are not easily formed in the corner section. Therefore, the lifetime of the corner section is longer as compared to the conventional cam disk in which metal flows are formed along the axis of the cam disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described with reference to FIGS. 1 to 13.

Figure 1:
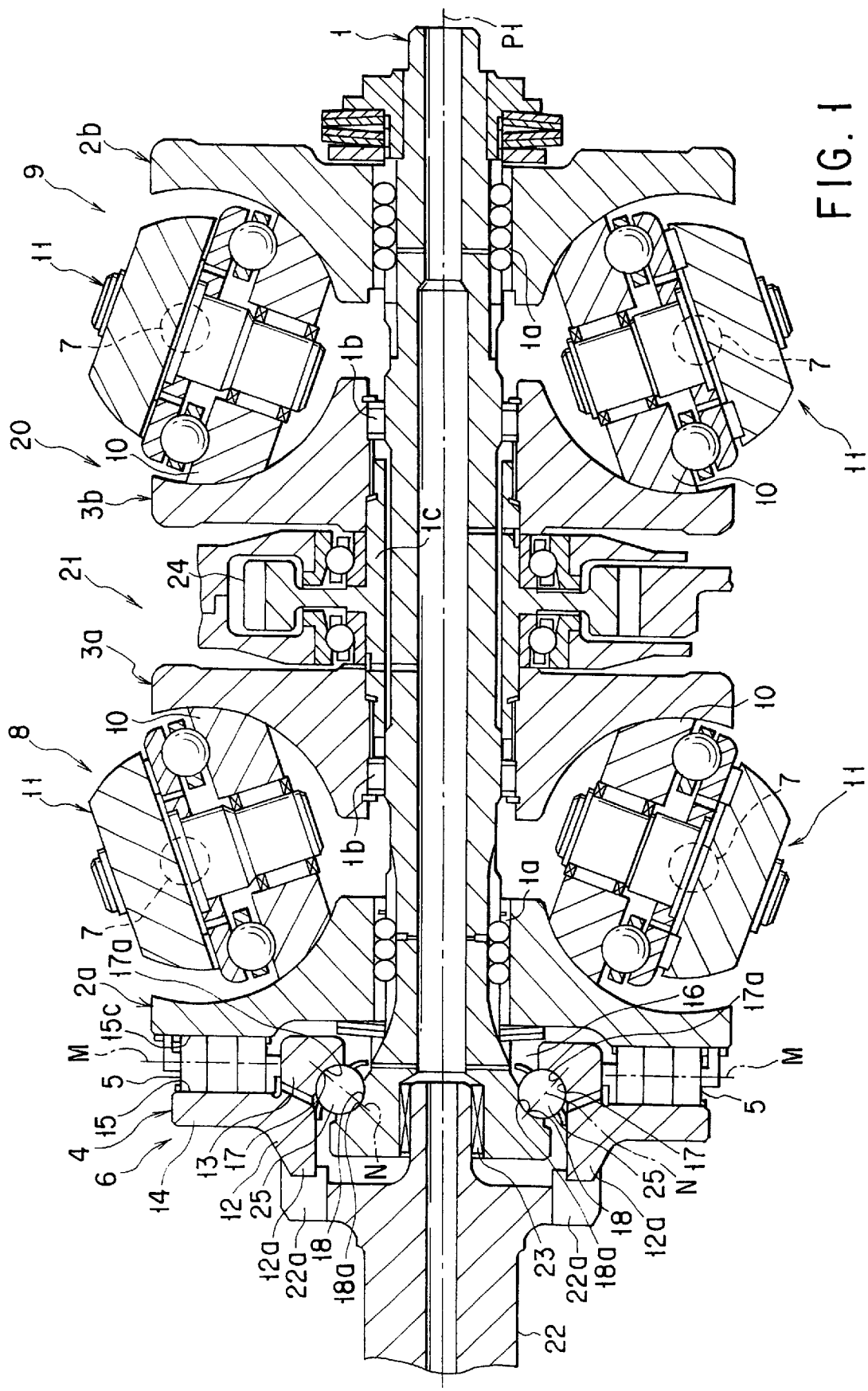
FIG. 1 is a vertical cross-sectional view showing a double-cavity half toroidal type continuously variable transmission having a cam disk according to an embodiment of the present invention.

FIG. 1 shows a cross section of a main mechanism portion (variator) 21 constituting a part of a double-cavity half toroidal type continuously variable transmission 20. The transmission 20 comprises an input disk 2a and an output disk 3a defining a first cavity 8, and an input disk 2b and an output disk 3b defining a second cavity 9. A pair of power rollers 10 are set between the first disks 2a and 3a. The outer circumferences of the power rollers 10 are brought into contact with the traction surfaces of the disks 2a and 3a. A pair of power rollers 10 are also set between the second disks 2b and 3b. The outer circumferences of the power rollers 10 are brought into contact with the traction surfaces of the disks 2b and 3b.

The input disks 2a and 2b are attached to an input shaft 1 by means of a spline coupling portion (e.g. ball spline) 1a so as not to be rotatable relative to each other. In other words, the input disks 2a and 2b are rotated along with the input shaft 1. The input shaft 1 is coupled with a drive shaft 22 via a bearing 23 so as to be rotatable relative to each other. The drive shaft 22 is rotated by means of a driving source, such as an engine, via a bearing 23. Each power roller 10 is rotatably connected to a trunnion 11 by means of a power roller bearing 10a. Each trunnion 11 is rockable around a trunnion shaft 7.

The output disks 3a and 3b are arranged between the input disks 2a and 2b. The first output disk 3a faces the first input disk 2a, and the second output disk 3b faces the second input disk 2b. The output disks 3a and 3b are attached to the input shaft 1 via a bearing 1b so as to be rotatable relative to shaft 1. The output disks 3a and 3b are coupled by a coupling member 1c so as to rotate in synchronism with each other. The coupling member 1c includes an output gear 24. The output gear 24 rotates in association with an output shaft (not shown) for outputting rotary movement of the input shaft 1.

A loading cam mechanism 6 functioning as a pressing mechanism is provided at the back of the first input disk 2a. The loading cam mechanism 6 includes a cam disk 4 and a roller 5 serving as a pressing member. The cam disk 4 is coaxial with the disks 2a, 2b, 3a and 3b with respect to the input shaft 1. The cam disk 4 is rotatably supported by the input shaft 1 via a ball 25 serving as a rolling element. As shown in FIGS. 2 to 5, the cam disk 4 integrally comprises a first projecting portion 12 and a second projecting portion 13 formed in a central portion of the disk, a flange portion 14, and a cam surface 15. The projecting portions 12 and 13 are projected from the cam disk 4, forward and backward, along the axis P (shown in FIG. 2) of the cam disk 4. The thickness of the flange portion 14 is gradually reduced from the first projecting portion 12 toward the peripheral portion of the cam disk 4.

Figure 5:
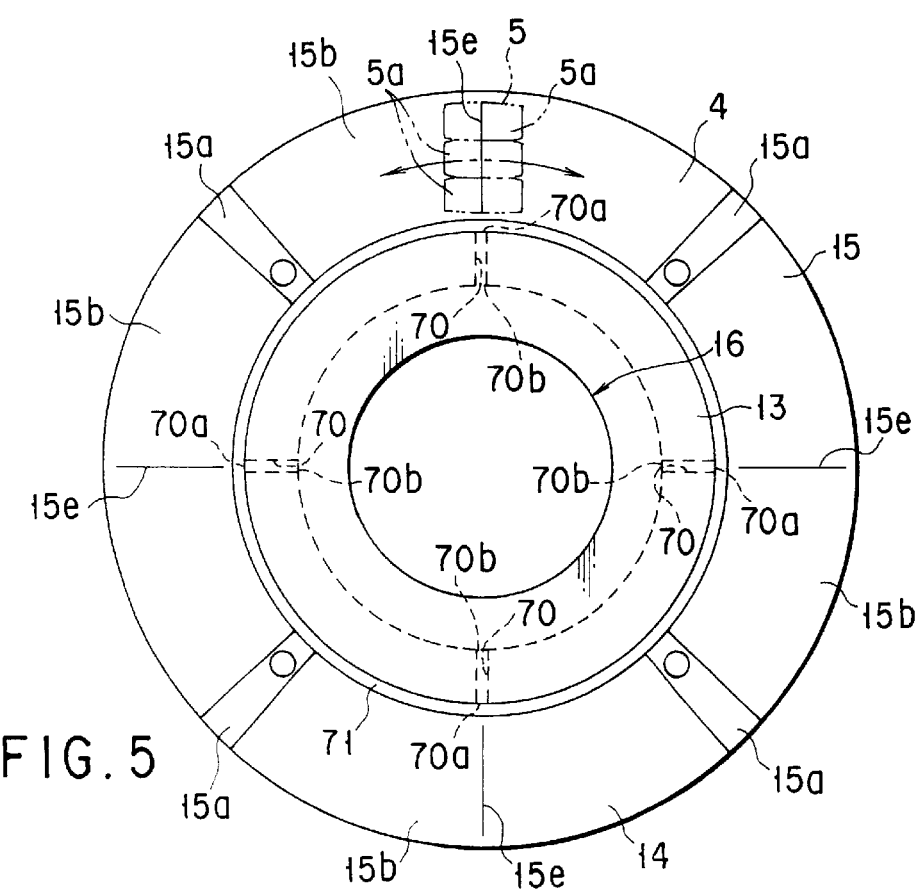
FIG. 5 is a bottom view of the cam disk as viewed from the direction of the arrow V in FIG. 3.
Figure 6:
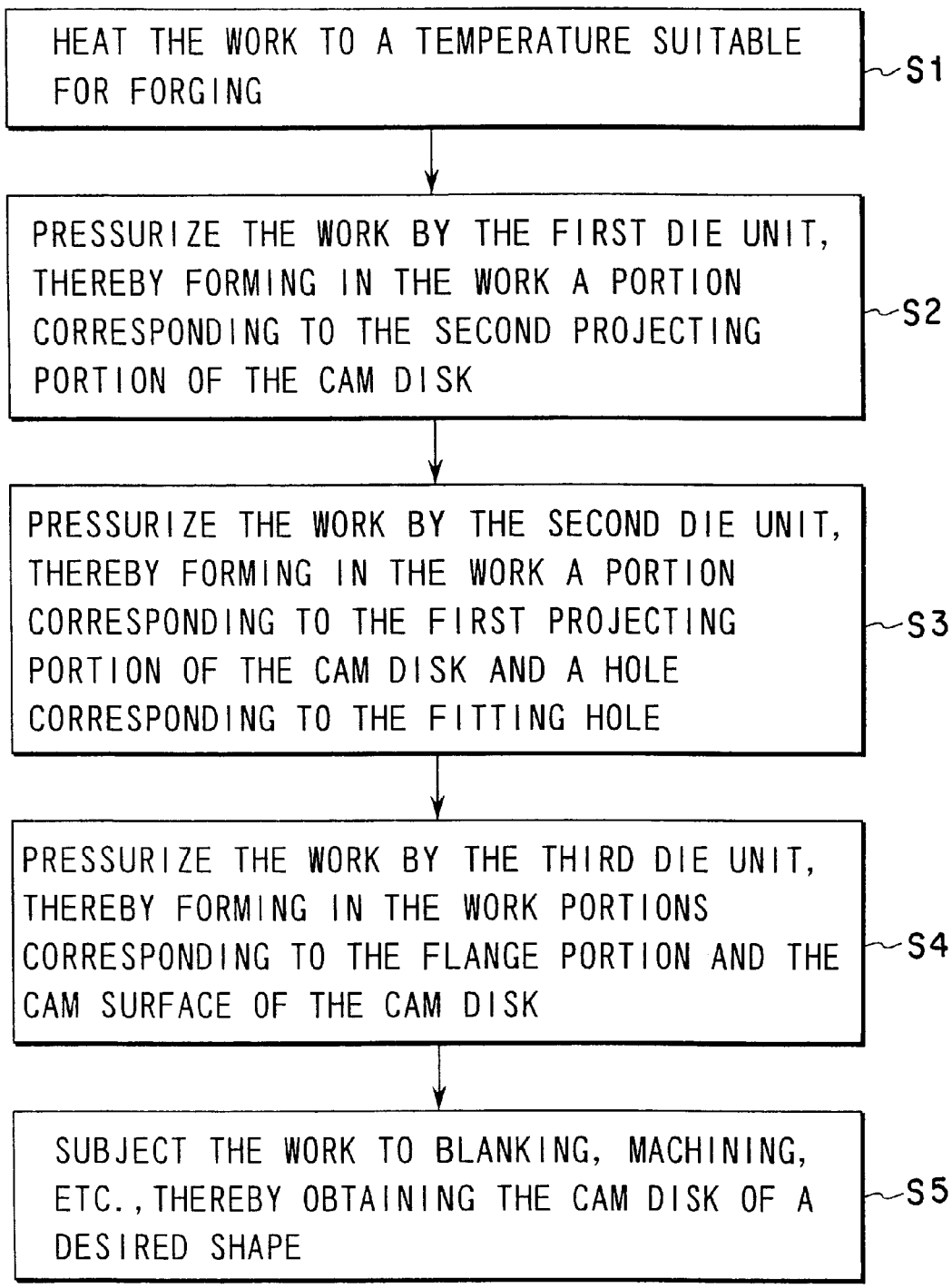
FIG. 6 is a flowchart illustrating an example of the process of producing the cam disk shown in FIG. 2.

The cam surface 15 is formed on all that surface of the flange portion 14, which faces the input disk 2a. The cam surface 15 has projecting portions 15a and recess portions 15b arranged alternately in the circumferential direction of the cam disk 4. The projecting portions 15a project in the direction of the axis P of the cam disk 4. The input disk 2a also has a cam surface 15c including projecting portions and recess portions corresponding to the cam surface 15. The roller 5 is brought into contact with the cam surfaces 15 and 15c, so that the input disk 2a is pressed toward the output disk 3a. As shown in FIG. 5, the roller 5 comprises a plurality of roller elements 5a arranged along the axes thereof. A corner section 19, where the cam surface 15 of the flange portion 14 intersects the second projecting portion 13, is curved to have an arc-shaped cross section.

In the central portion of the cam disk 4, a fitting hole 16 is formed, through which the input shaft 1 is inserted. A continuous raceway 17 is formed in the overall inner circumference of the fitting hole 16. A continuous raceway 18 is formed in the overall outer circumference of the input shaft 1. The raceways 17 and 18 have arc-shaped cross sections corresponding to the outer diameter of the ball 25. A line segment N connecting bottoms 17a and 18a of the raceways 17 and 18 is inclined with respect to the axis P1 of the input shaft 1. When the first input disk 2a is pressed by the roller 5 in the direction toward the first output disk 3a, the counterforce is applied to the input shaft 1 via the ball 25, thereby pressing the input shaft 1 toward the power source. As a result, the second input disk 2b is pressed toward the second output disk 3b. The input shaft 1 and the cam disk 4 are rotatable relative to each other via the ball 25 rotatably held between the raceways 17 and 18.

The cam disk 4 comprises teeth 12a formed integral with an end portion of the first projecting portion 12. The teeth 12a mesh with teeth 22a formed in the drive shaft 22, so that the cam disk 4 is rotated along with the drive shaft 22. In other words, the rotation of the drive shaft 22 is transmitted to the cam disk 4 via the teeth 12a and 22a. As a result, the first input disk 2a and the second input disk 2b are rotated. The rotation of the first input disk 2a is transmitted to the first output disk 3a via the power roller 10. The rotation of the second input disk 2b is transmitted to the second output disk 3b via the power roller 10. As a result, the output gear 24 is rotated.

As shown in FIG. 5, rollers 5 are located at four positions at regular pitch along the circumference of the cam disk 4. Each roller 5 is rotatable about an axis M (shown in FIG. 1) radiating from the axis P1 of the input shaft 1. When the drive shaft 22 is rotated with the rollers sandwiched between the cam surfaces 15 and 15c, as the cam disk 4 is rotated, the first input disk 2a is pressed toward the first output disk 3b and rotated along with the cam disk 4. In addition, since the counterforce received by the cam disk 4 is applied to the input shaft 1 via the ball 25, the second input disk 2b is pressed toward the second output disk 3b. Thus, the rotation force of the engine transmitted from the drive shaft 22 to the cam disk 4 rotates the input disks 2a and 2b. The rotation of the input disks 2a and 2b is transmitted to the output disks 3a and 3b through the power rollers 10, thereby rotating the output gear 24.

The cam disk 4 is produced through a heating step S1, a first forging step S2, a second forging step S3, a third forging step S4, a finishing step S5, etc. as described below.

Figure 7A:
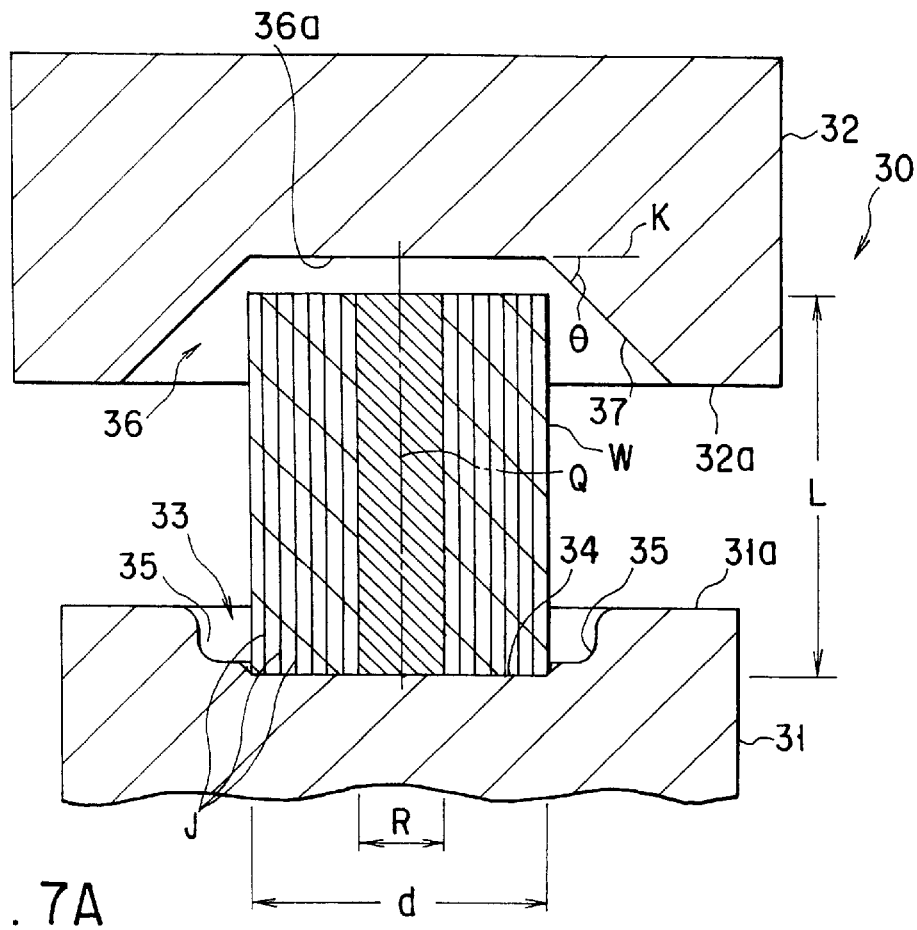
FIG. 7A is a cross-sectional view of a first die unit and a work used for producing the cam disk.
Figure 7B:
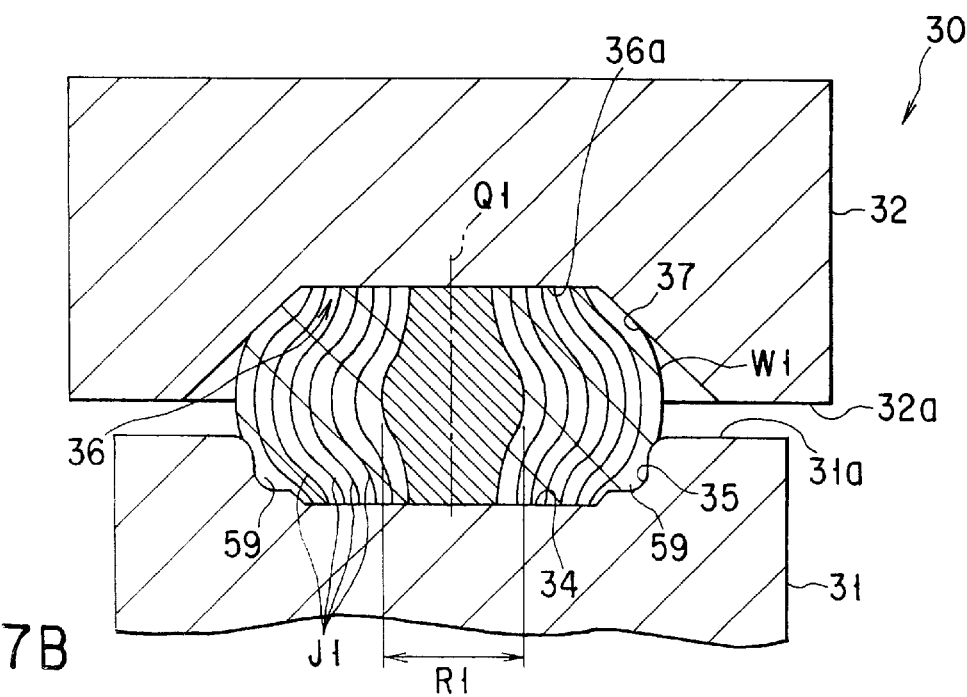
FIG. 7B is a cross-sectional view showing a state of the work shaped by the first die unit shown in FIG. 7A.

In the first forging step S2, as shown in FIGS. 7A and 7B, a first die unit 30 is used. The die unit 30 has a first lower die 31 and a first upper die 32. The lower and upper dies 31 and 32 compress a cylindrical material W (hereinafter referred to as a work) along the axis Q of the work W from both ends thereof. The work W is made of alloy steel, for example, bearing steel.

Through the production process in steps of melting and cooling the material, the work w shown in FIG. 7A comes to contain a relatively large amount of impurities in a closely hatched portion, i.e., a portion R within 30% or less of the diameter d of the work from the center. Moreover, through a rolling process, etc., the work W is formed as a solid material which has substantially the same diameter d at any points on the axis Q. Therefore, metal flows J as described before are formed along the axis Q.

The work W of this embodiment is shaped as a form in which the ratio of the length L to the diameter d satisfies the following formula (1):

$$L/d \leq 2.2 \tag{1}$$

When the above formula (1) is satisfied, the work W mounted on the lower die 31 is positioned more accurately. Therefore, metal flows J1 of the work W1 (shown in FIG. 7B) shaped through the first forging step S1 are symmetric with respect to the axis Q1. For this reason, desired metal flows J2 and J3 can be easily obtained in the second and third forging steps S3 and S4 described below.

A first recess portion 33 is formed in a central portion of a substantially flat end surface 31a of the first lower die 31. The recess portion 33 is shaped as a circle having an inner diameter larger than the outer diameter of the work W. A recess 34, having a diameter substantially the same as the outer diameter of the work W and functioning as a holding portion, is formed in a central portion of the recess portion 33. When the work W is placed on the lower die 31, the recess 34 holds the work W in such a position that the axis Q of the work W is substantially perpendicular to the end surface 31a of the lower die 31. In the inner circumference of the recess portion 33, a projecting portion forming surface 35, corresponding to the shape of the external form of the second projecting portion 13 of the cam disk 4, is formed all around the periphery of the recess portion 33. The projecting portion forming surface 35 is slightly greater than the external form of the second projecting portion 13 of the cam disk 4.

A recess portion 36 is formed in a lower surface of the first upper die 32, i.e., an end surface 32a which faces the upper end of the work W. The recess portion 36 functions as a holding portion for restricting the position of the work W, when the first upper die 32 presses the work W. A bottom surface 36a of the recess portion 36 is flat and substantially perpendicular to the axis Q of the work W. The bottom surface 36a is a circle having a diameter substantially the same as the outer diameter d of the work W. The recess portion 36 has an inclined surface 37, the inner diameter of which is gradually reduced from the end surface 32a toward the bottom surface 36a of the first upper die 32. The recess portion 36 is slightly greater than the external form of the first projecting portion 12 of the cam disk 4. It is preferable that an angle θ between an extension line K (shown in FIG. 7A) of the bottom surface 36a and the inclined surface 37 be 45°±10°.

Figure 8A:
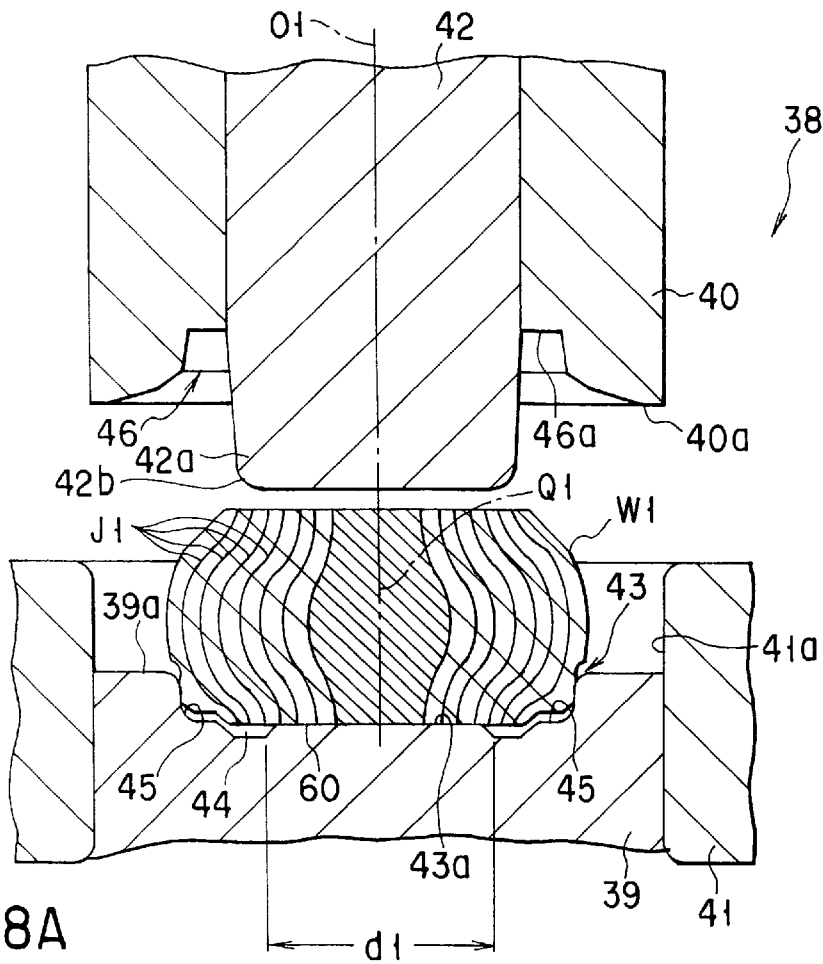
FIG. 8A is a cross-sectional view of a second die unit and a work used for producing the cam disk.
Figure 8B:
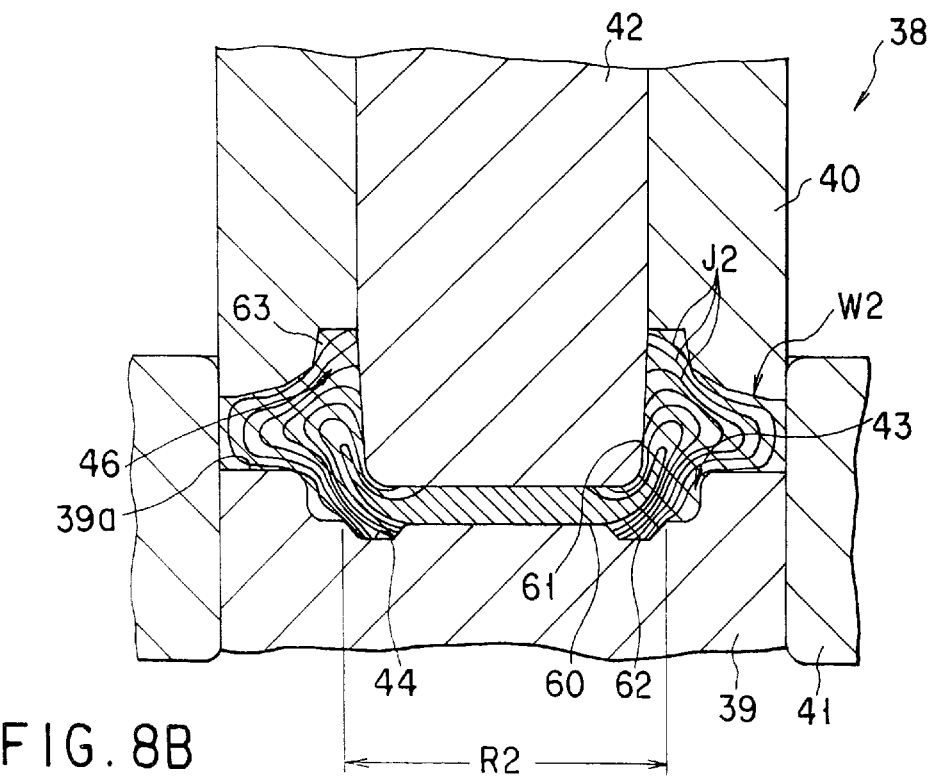
FIG. 8B is a cross-sectional view showing a state of the work shaped by the second die unit shown in FIG. 8A.

In the second forging step S3, a second die unit 38 as shown in FIGS. 8A and 8B is used. The second die unit 38 has a second lower die 39, a second upper die 40, an outer die 41 surrounding the second lower die 39 and an inner die 42 arranged inside the second upper die 40. The outer diameter of the second lower die 39 is greater than that of the work W1 formed by the first forging step S2. A circular recess 43 functioning as a work holding portion is formed in a central portion of an upper end surface 39a of the second lower die 39. The inner diameter of the recess 43 is substantially the same as the outer diameter of the work W1. The inner surface of the recess 43 constitutes a shaping surface corresponding to the outer shape of the work W2 to be formed (shown in FIG. 8B).

As shown in FIG. 8A, the work W1 is placed on a bottom surface 43a of the recess 43. The bottom surface 43a is substantially flat and perpendicular to the axis Q1 of the work W1. An annular groove 44 coaxial with the bottom surface 43a is formed in the bottom surface 43a. The inner diameter d1 of the annular groove 44 is slightly smaller than the inner diameter of the fitting hole 16 for fitting the cam disk 4. As shown in FIG. 8B, a projecting portion 62 is formed on a bottom 60 of the work W2 in accordance with the annular groove 44. The projecting portion 62 can be fitted with a projection 54 of a third die unit 47 described later. A curved surface portion 45 is formed in an outer periphery of the annular groove 44, i.e., between the bottom surface 43a and the inner periphery of the recess 43. The curved surface portion 45 has a shape equivalent to the projecting portion forming surface 35 of the first die unit 30.

The outer die 41 surrounds the outer periphery of the second lower die 39. The upper end surface of the outer die 41 is located higher than the upper end surface 39a of the second lower die 39. An inner circumference 41a of the outer die 41 is annular so as to surround the work W1. The inner circumference 41a is parallel to the axis Q1 of the work W1.

The outer diameter of the hollow cylindrical second upper die 40 is slightly smaller than the inner diameter of the outer die 41. The upper die 40 has an end surface 40a serving as a shaping surface which faces the upper portion of the work W1. A recess 46 is formed in a central portion of the end surface 40a. The recess 46 has a configuration corresponding to the outer shape of the first projecting portion 12 of the cam disk 4 and slightly greater than the first projecting portion 12. The inner die 42 is located in the center of the recess 46. The inner die 42 is a cylindrical rod and the outer diameter thereof is slightly smaller than the inner diameter of the fitting hole 16 of the cam disk 4. A lower end portion 42a of the inner die 42 projects from the bottom surface 46a of the recess 46 toward the work W1. The axis O1 of the inner die 42 coincides with the axis Q1 of the work W1. A curved surface portion 42b, the diameter of which is reduced toward the lower end thereof, is in the lower end portion 42a of the inner die 42.

Figure 9A:
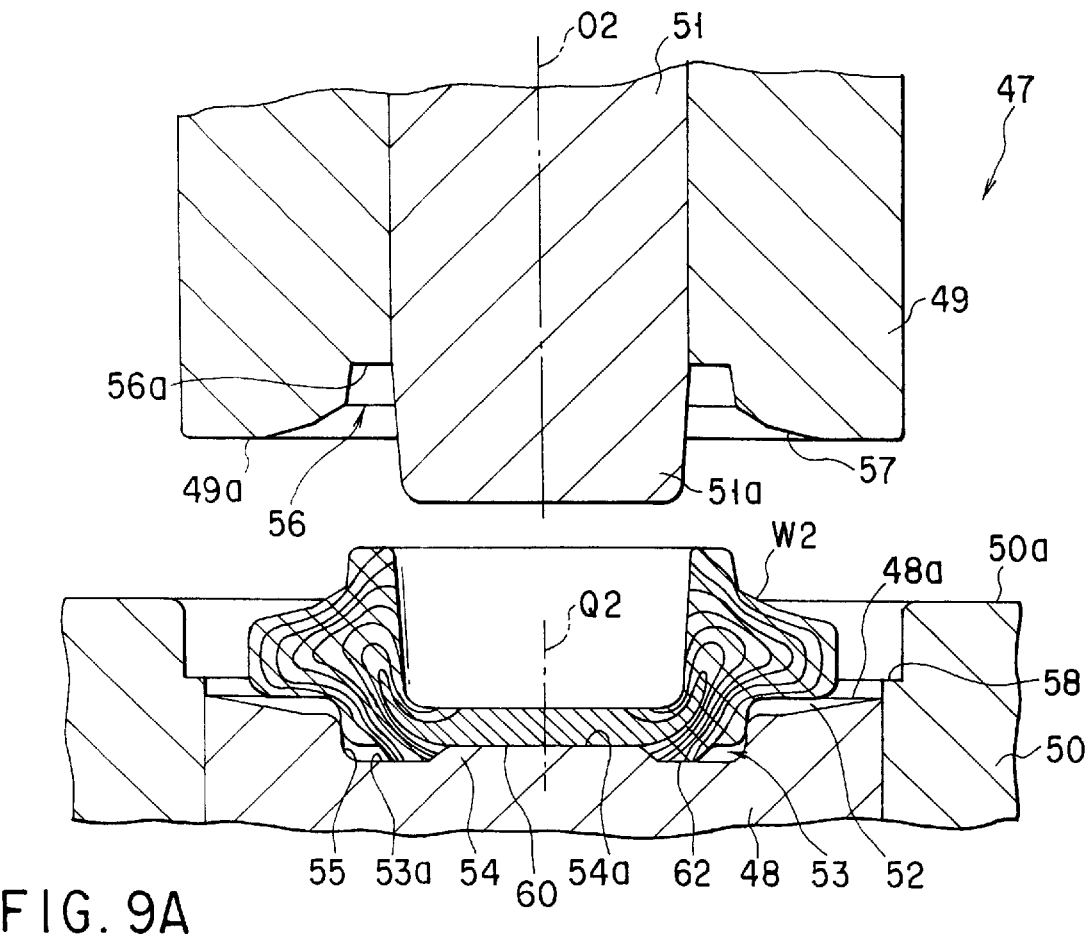
FIG. 9A is a cross-sectional view of a third die unit and a work used for producing the cam disk.
Figure 9B:
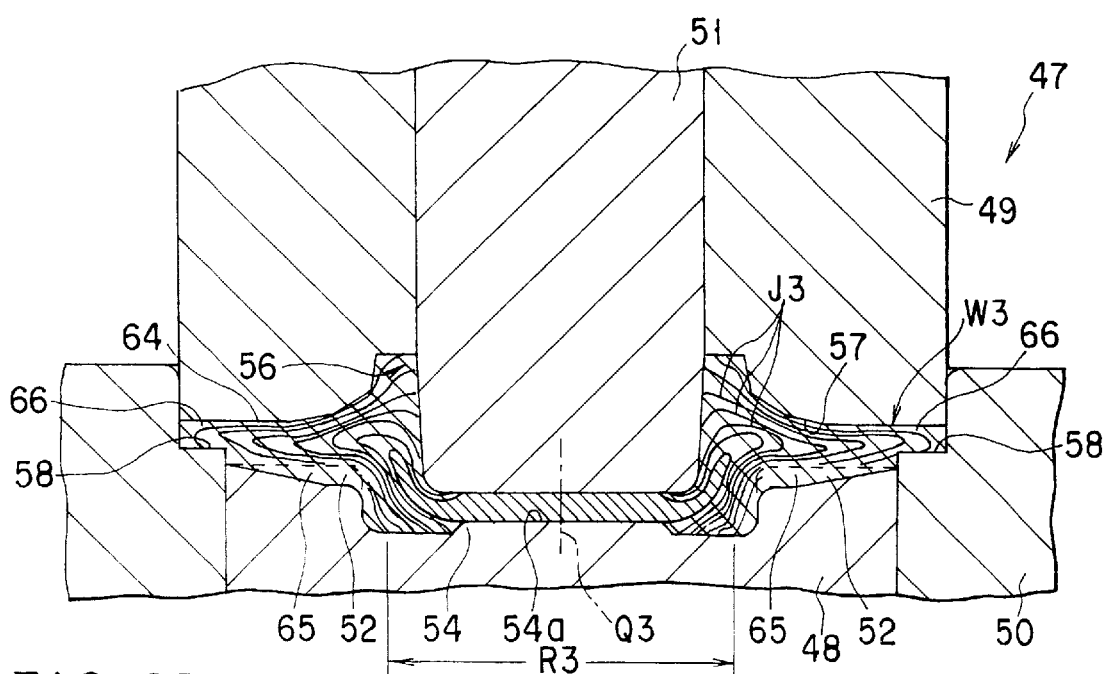
FIG. 9B is a cross-sectional view showing a state of the work shaped by the third die unit shown in FIG. 9A.

In the third forging step S4, a third die unit 47 as shown in FIGS. 9A and 9B is used. The third die unit 47 has a third lower die 48, a third upper die 49, an outer die 50 surrounding the third lower die 48 and an inner die 51 arranged in a central portion of the third upper die 49.

As shown in FIG. 9A, the outer diameter of the third lower die 48 is greater than that of the second lower die 39. An upper end surface 48a of the third lower die 48 has a cam forming portion 52 of a shape corresponding to the cam surface 15 of the cam disk 4 and a recess 53 formed in a central portion of the cam forming portion 52. The inner diameter of the recess 53 is the same as that of the recess 43 of the second lower die 39. The recess 53 functions as a holding portion for positioning the work W2. A circular projection 54, projecting upward, is formed in the center of a bottom surface 53a of the recess 53. As shown in FIG. 9A, the work 2 is placed on an end surface 54a of the projection 54. The end surface 54a is flat and perpendicular to the axis Q2 of the work W2. The outer diameter of the projection 54 is slightly smaller than the inner diameter of the fitting hole 16 of the cam disk 4. A curved portion 55, having the same shape as that of the projecting portion forming surface 35 of the first die unit 30, is formed in a portion where the inner circumference and the bottom surface 53a of the recess 53 intersect.

The third upper die 49 has a hollow cylindrical shape. The outer diameter of the upper die 49 is slightly greater than that of the third lower die 48. A lower end surface 49a of the third upper die 49 constitutes a shaping surface which faces the work W2. A recess 56 is formed in a central portion of the lower end surface 49a. The recess 56 has substantially the same shape as the recess 46 of the second die unit 38. The lower end surface 49a of the third upper die 49 includes an inclined surface 57. The inclined surface 57 has a configuration corresponding to the flange portion 14 of the cam disk 4.

The outer die 50 surrounds the outer periphery of the third lower die 48. An upper end surface 50a of the outer die 50 is located higher than the upper end surface 48a of the third lower die 48. A step portion 58 is formed in an upper portion of the outer die 50, i.e., a portion higher than the upper end surface 48a of the third lower die 48. The inner diameter of the step portion 58 is slightly greater than the third upper die 49. Therefore, the third upper die 49 can be inserted into the outer die 50. In a state where the third upper die 49 is inserted in the outer die 50 as shown in FIG. 9B, a certain gap is defined between the end surface 49a of the upper die 49 and the step portion 58. The configuration of the inner die 51 is substantially the same as that of the inner die 42 of the second die unit 38. A lower end portion 51a of the inner die 51 projects downward from a bottom surface 56a of the recess 56 of the third upper die 49. As shown in FIG. 9A, in a state where the work W2 is placed on the third lower die 48, the axis O2 of the inner die 51 coincides with the axis Q2 of the work W2.

A process for producing the cam disk 4 will now be described with reference to FIGS. 6 to 12. In the heating step S1, the work W is heated by suitable heating means such as an induction heater to a temperature suited to forging at which the work can be easily deformed. Thereafter, upsetting is performed in the first forging step S2. In the forging step S2, the work W is placed on the first lower die 31, as shown in FIG. 7A. At this time, the work W is fitted in the recess 34 of the lower die 31, thereby held at a predetermined position.

Then, the first upper die 32 is lowered as shown in FIG. 7B, thereby pressurizing the work between the lower die 31 and the upper die 32. Thus, the work W1 is shaped into a form corresponding to the projecting portion forming surface 35 of the lower die 31, the recess 36 of the upper die 32, etc. In the work W1, a portion 59 corresponding to the second projecting portion 13 of the cam disk 4 is formed by the projecting portion forming surface 35 of the lower die 31. In addition, the work W1 is sandwiched between and expanded by the lower die 31 and the upper die 32, so that the outer diameter thereof is increased. By the first forging step S2, the metal flows J1 of the work W1 are caused to run outward at central portions thereof in the direction along the axis Q1 of the work W1. A portion R1 containing a relatively great deal of impurities is also extended outward in a central portion thereof in the direction along the axis Q1 of the work W1. In the first forging step S2, since the work W1 is held at the predetermined position by the recess 34 of the lower die 31, the inclined surface 37 of the recess 36 of the upper die 32, etc., it is not displaced between the lower die 31 and the upper die 32.

After the first forging step S2 is completed, die forging is performed in the second forging step S3. In the second forging step S3, the work W1 is placed in the recess 43 of the second lower die 39, as shown in FIG. 8A. The outer diameter of the work W1 is substantially the same as the inner diameter of the recess 43 of the second lower die 39. Therefore, the work W1 is not displaced from the lower die 39, with the axis Q1 being kept perpendicular to the bottom surface 43a. In addition, the bottom surface 60 of the work W1 is in close contact with the bottom surface 43a of the recess 43.

As shown in FIG. 8B, the work is pressurized between the second lower die 39 and the second upper die 40, thereby forming a work W2 having a shape corresponding to the recess 43 of the second lower die 39, the recess 46 of the second upper die 40 and the inner die 42. More specifically, the hole 61 corresponding to the fitting hole 16 of the cam disk 4 is formed by the inner die 42, while a portion 63 corresponding to the first projecting portion 12 of the cam disk 4 is formed by the recess 46 of the second upper die 40. The annular projecting portion 62 is formed on the bottom surface 60 of the work W2 by the annular groove 44. In this forging step, since the work W2 is fitted in the recess 43 of the lower die 39, it is prevented from being displaced.

As a result of the second forging step S3, metal flows J2 are formed along the shaping surface of the second die unit 38, such as the recesses 43 and 46, the circumferential surface of the inner die 42, etc. In the forging step S3, as shown in FIG. 8B, a portion R2 containing a relatively great deal of impurities is cramped between the bottom surface 43a inside the annular groove 44 of the lower die 39 and the lower surface of the inner die 42 and plastically deformed between these surfaces. Therefore, the portion R2 containing the impurities is suppressed from extending outward to the periphery of the work W2. The hole 61 formed in the forging step S3 does not penetrate through the work W2.

After the second forging step S3 is completed, die forging for finishing is performed in the third forging step S4. In the forging step S4, the work W2 is placed on the third lower die 48, as shown in FIG. 9A. At this time, the projecting portion 62 of the bottom surface 60 of the work W2 is fitted with the recess 53 of the lower die 48. Therefore, the work W2 is not displaced from the lower die 48, with the axis Q2 being kept perpendicular to the bottom surface 48a.

As shown in FIG. 9B, the work is pressurized between the lower die 48 and the upper die 49, thereby forming a work W3 which has a form corresponding to the cam forming portion 52 of the lower die 48, the recess 56 of the upper die 49 and the inclined surface 57. More specifically, a portion 64 corresponding to the flange portion 14 of the cam disk 4, burr or flash 66 and a portion 65 corresponding to the cam surface 15 are integrally formed. The portion 64 corresponding to the flange portion 14 is pressed between the lower die 48 and the upper die 49 and the outer diameter thereof is extended, so that the portion 64 is shaped into a form along the inclined surface 57, etc. The portion 65 corresponding to the cam surface 15 is shaped into a form along the cam forming portion 52 of the lower die 48. The burr or flash 66 is formed between the step portion 58 of the outer die 50 and the upper die 49.

As a result of the third forging step S4, metal flows J3 are formed along the projection 54 of the lower die 48, the inner die 51, the cam forming portion 52, the inclined surface 57, etc., as shown in FIG. 9B. A portion R3 containing the relatively great deal of impurities is cramped between the end surface 54a of the projection 54 and the lower surface of the inner die 51 and plastically deformed between these surfaces. Therefore, the portion R3 containing the impurities is suppressed from extending outward to the circumference of the work W3.

Figure 10:
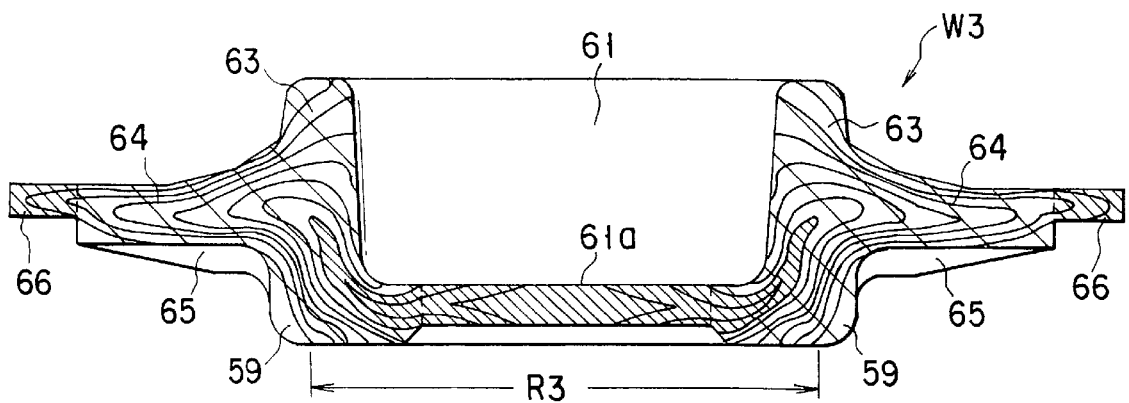
FIG. 10 is a cross-sectional view of the work shown in FIG. 9B.
Figure 11:
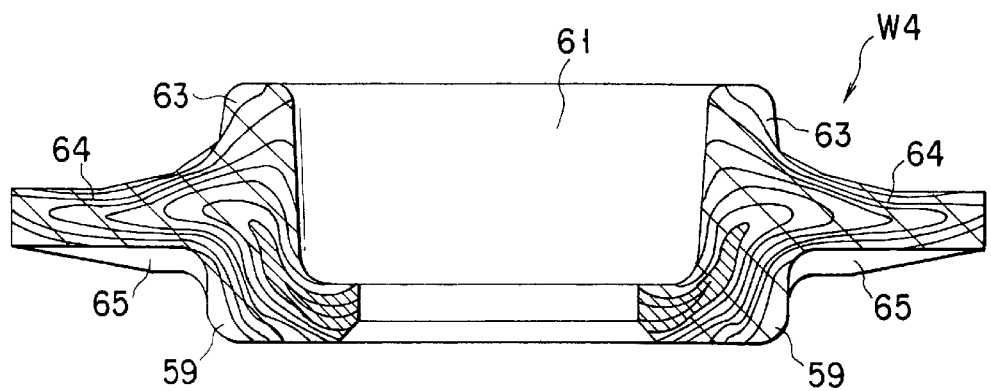
FIG. 11 is a cross-sectional view of a work obtained by blanking out a part of the work shown in FIG. 10 by a press.
Figure 12:
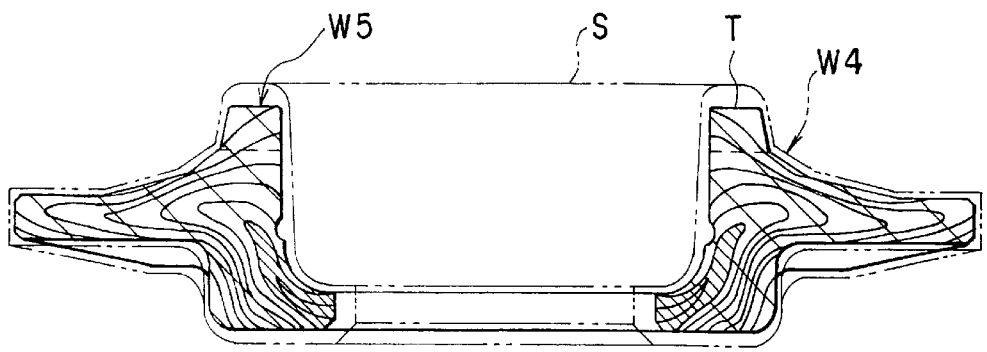
FIG. 12 is a cross-sectional view of a work obtained by cut-processing the work shown in FIG. 11.

As described below, in the finishing step S5, the work W3 is subjected to blanking, machining, etc., so that the cam disk 4 of a desired shape can be obtained. First, a part of the work W3 shown in FIG. 10 is blanked out by a press, thereby removing the burr or flash 66 and a bottom 61a. As a result, a work W4 having a through hole 61 as shown in FIG. 11 is obtained. Thereafter, a surface portion of the work W4 (indicated by the two-dots chain line S) shown in FIG. 12 is machined. Thus, a work W5 having a shape corresponding to the cam disk 4, as indicated by the solid line T, is obtained. The work W5 is subjected to a heat-treatment such as carburizing or carbonitriding. Further, the work W5 is grinded and polished to a necessary accuracy, with the result that the cam disk 4 of the half toroidal type continuously variable transmission shown in FIG. 2 is completed.

In the cam disk 4, the portion R of the unprocessed work w (shown in FIG. 7A), containing a relatively great deal of impurities, is restricted by the dies 31, 39, 42, 48, 51, etc. from expanding toward the outer periphery in the forging steps S2, S3 and S4. For this reason, most part of the portion R is removed by blanking out the bottom 61a of the hole 61 in the finishing step S5.

In the second and third forging steps S3 and S4, the metal flows J2 and J3 are formed along the shaping surfaces of the second die unit 38 and the third die unit 47. Therefore, the cam disk 4 has metal flows J4 formed along the cam surface 15 and the surfaces of the raceway 17 and the corner section 19, as shown in FIG. 2. The angle θ2 defined between the tangent of the surface of the raceway 17 and the metal flows J4 and the angle θ3 defined between the cam surface 15 and the metal flows J4 are both 30° or smaller. For this reason, in the cam disk 4, end flows are not liable to be formed on the cam surface 15 and the surfaces of the raceway 17 and the corner section 19. In particular, the surface of the raceway 17 is not liable to flake due to contact with the ball 25.

Figure 2:
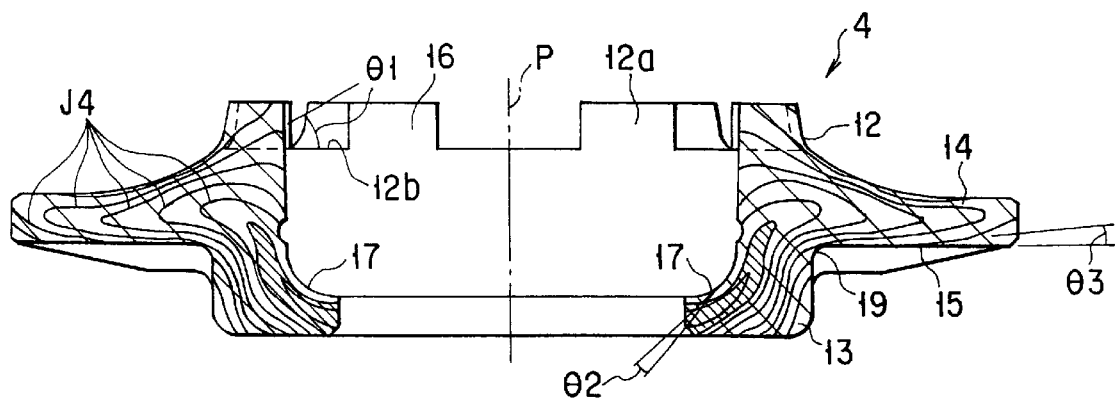
FIG. 2 is a cross-sectional view showing the cam disk of the embodiment.
Figure 3:
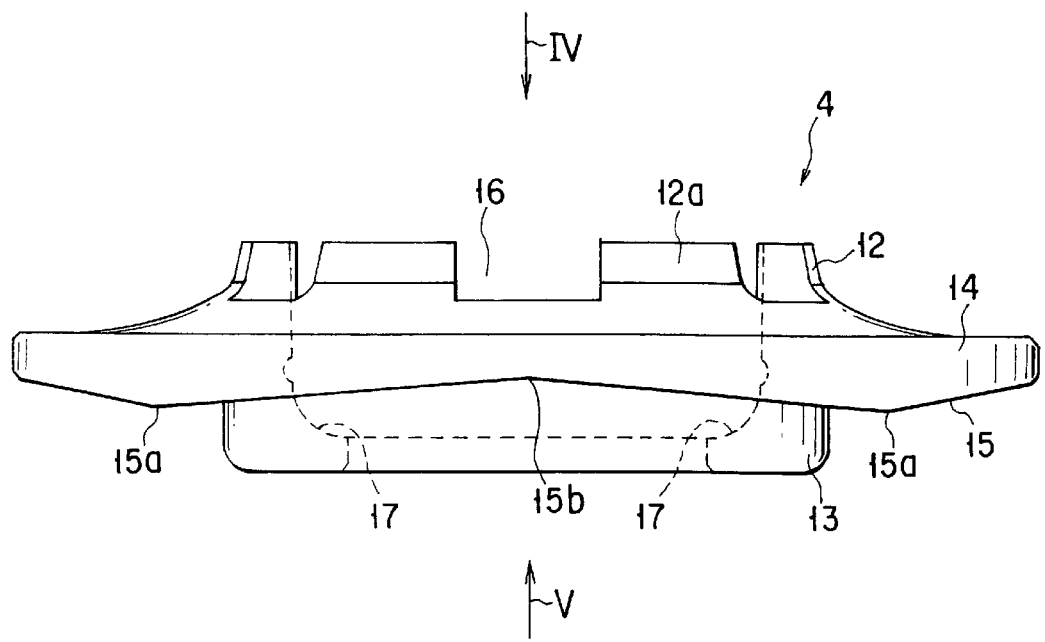
FIG. 3 is a side view showing the cam disk of the embodiment.
Figure 4:
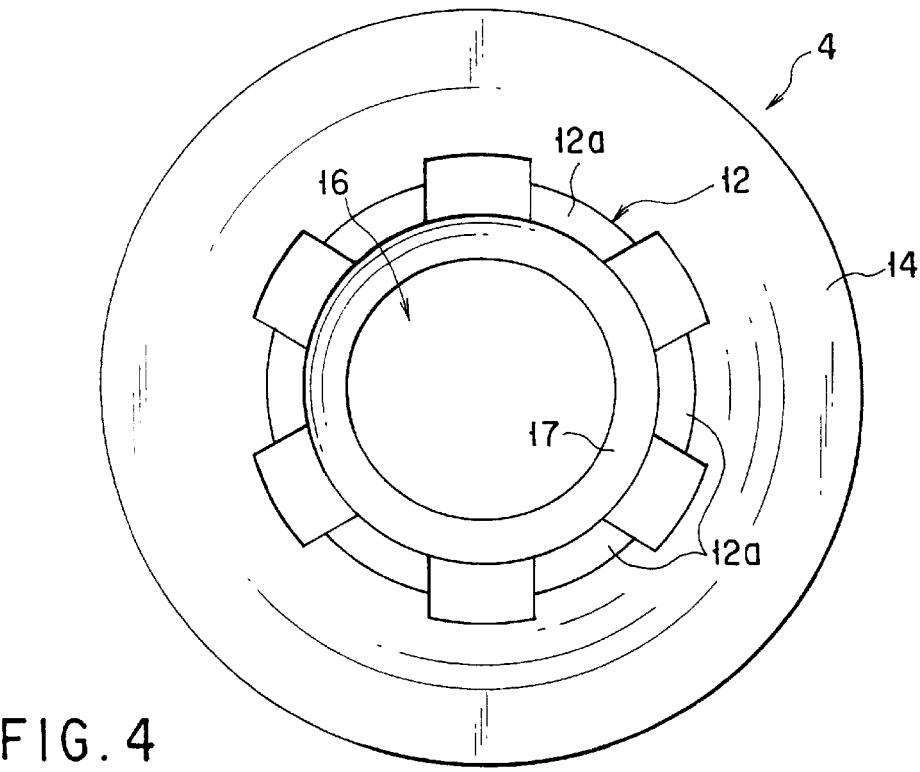
FIG. 4 is a plan view of the cam disk as viewed from the direction of the arrow IV in FIG. 3.

As shown in FIG. 2, in the teeth 12a, the angle θ1 between the bottom surface 12b and the metal flows J4 is 30° or greater. Therefore, even if considerable stress (compressive stress and tensile stress) is exerted on the teeth 12a by the torque transmitted from the drive shaft 22, the teeth 12a will not easily break. For the reasons stated above, the toroidal type continuously variable transmission 20 having the cam disk 4 of the present invention has high durability. In addition, since the cam disk 4 is shaped into a predetermined form through the first to third forging steps S2, S3 and S4, the yield is improved, the processing time is reduced and the production cost is lowered.

According to the production method described above, in the first forging step S2, the first die unit 30 is used mainly to form the portion 59 corresponding to the second projecting portion 13 of the cam disk 4. In the second forging step S3, the second die unit 38 is used mainly to form the portion 63 corresponding to the first projecting portion 12 and the hole 61 corresponding to the fitting hole 16. In the third forging step S4, the third die unit 47 is used mainly to form the portion 64 corresponding to the flange portion 14 and the portion 65 corresponding to the cam surface 15. Thus, in each forging step, since the die unit 30, 38 or 47 is in contact with the work in a short period of time, the high heat of the work influences less on the die units 30, 38 and 47 when the work is forged. Therefore, the surface hardness of the forming surfaces of the die units 30, 38 and 47 is maintained, resulting in that reduction in lifetime of the die units is suppressed.

Further, in each forging step S2, S3 and S4, since the works are respectively formed by the die units 30, 38 and 47, which are different little by little in shape, they can be shaped easily. Accordingly, since the metal texture of the work flows smoothly in the forging steps S2, S3 and S4, the cam disk 4 having balanced metal flows can be obtained. For the same reason, the pressure applied to the die units 30, 38 and 47 in the forging steps S2, S3 and S4 is limited low, thereby preventing the die units 30, 38 and 47 from breakage.

In the forging step S2, S3 or S4, since the work is positioned by the recess 34, 43, 53, or the like, the work is not displaced from the die unit 30, 38 or 47 during the forging step. Therefore, the cam disk 4 can be formed with high accuracy. As the cam disk 4 is subjected to the finishing step S5 such as blanking, machining, etc., after the forging steps S2–S4, the cam disk 4 which has shape with high accuracy can be obtained. Since the shape of the cam disk 4 is finished in the finishing step S5, the requirement for forming accuracy in the forging steps S2, S3 and S4 can be moderated.

The method for producing the cam disk according to the above embodiment is summarized as follows. The cam disk 4 produced by the method comprises first and second projecting portions 12 and 13 projected from a central portion of the cam disk 4 in both axial directions of the cam disk; a flange portion 14, the thickness of which is gradually reduced from the first projecting portion 12 toward the peripheral portion and which has a cam surface 15 having projections and recesses projected and recessed along the axis of the cam disk; and a fitting hole 16 extending through the first and second projecting portions 12 and 13 along the axis. Pressing means such as a roller 5 for pressing an input disk 2a toward an output disk 3a is interposed between the cam surface 15 and the input disk 2a.

The method for producing the cam disk 4 thus constructed comprises the steps of:

a first forging step S2 for forming a portion 59 corresponding to the second projecting portion 13 by pressurizing along the axis of a solid cylindrical work which has metal flows running along the axis of the work by means of a first die unit 30 having a shaping portion corresponding to the second projecting portion 13;

a second forging step S3 for forming a portion 63 corresponding to the first projecting portion 12 and a hole 61 corresponding to the fitting hole 16 by pressurizing the work along the axis by means of a second die unit 38 which has a shaping portion corresponding to the first projecting portion 12 and a shaping portion corresponding to the fitting hole 16;

a third forging step S4 for forming a portion 64 corresponding to the flange portion 14 and a portion 65 corresponding to the cam surface 15 by pressurizing the work along the axis by means of a third die unit 47 having a shaping portion corresponding to the flange portion 14 and a shaping portion corresponding to the cam surface 15; and a finishing step S5 for blanking out a central portion or the like of the work.

In the first forging step S2, forging is performed in the state where at least one end surface of the work is restricted. Therefore, a portion containing a comparatively large amount of impurities, i.e., a portion 30% or less of the diameter of the work from the center, is suppressed from extending outward to the circumference. For this reason, most part of the portion containing the impurities is removed by blanking out the central portion of the work in the finishing step S5. Further, according to the above method, metal flows are formed along the cam surface 15 and the surface of the raceway 17. Therefore, end flows are not easily formed on the cam surface 15 and the surface of the raceway 17, so that a cam disk of a long lifetime can be obtained. At least one of the first to third die units 30, 38 and 47 has a holding portion for positioning the work. When the work is forged by means of the die units 30, 38 and 47, the work can be shaped with high accuracy, which is advantageous for obtaining desired metal flows.

Figure 13:
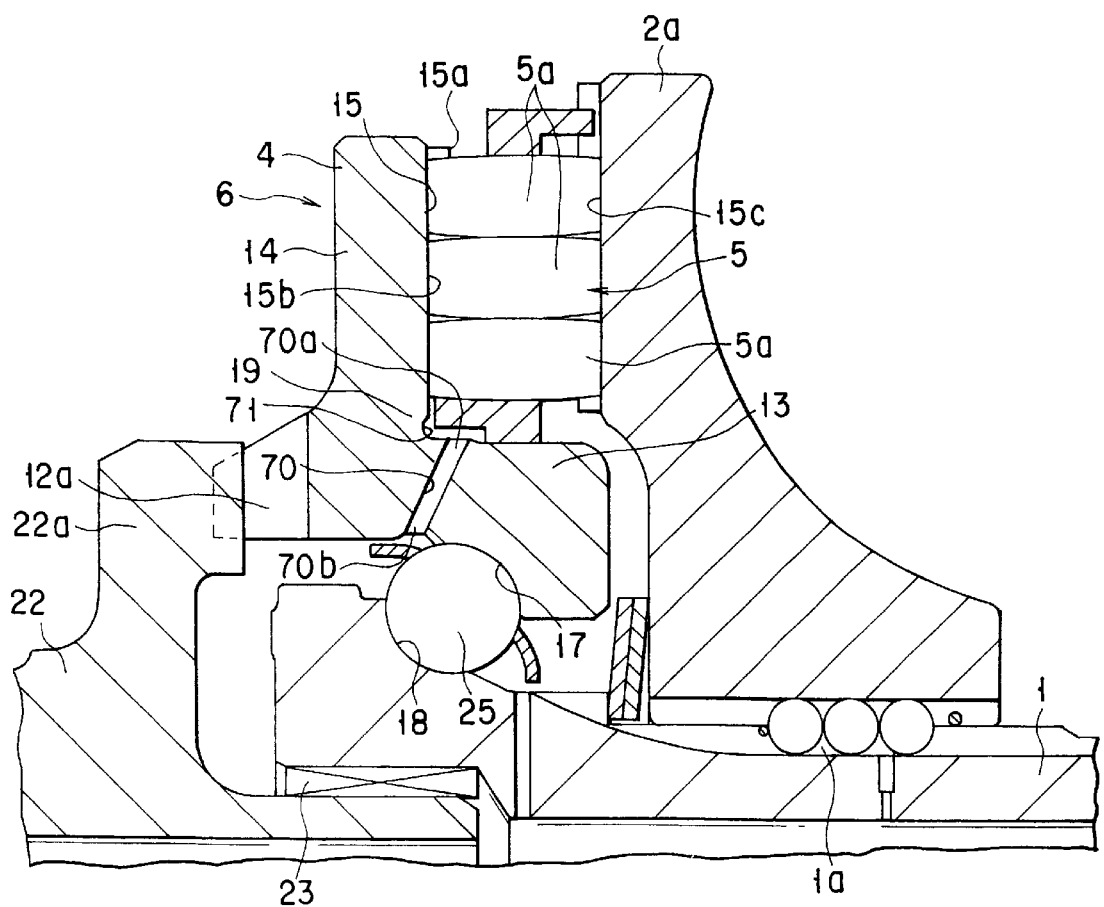
FIG. 13 is a partially enlarged cross-sectional view of the toroidal type continuously variable transmission shown in FIG. 1.
Figure 14:
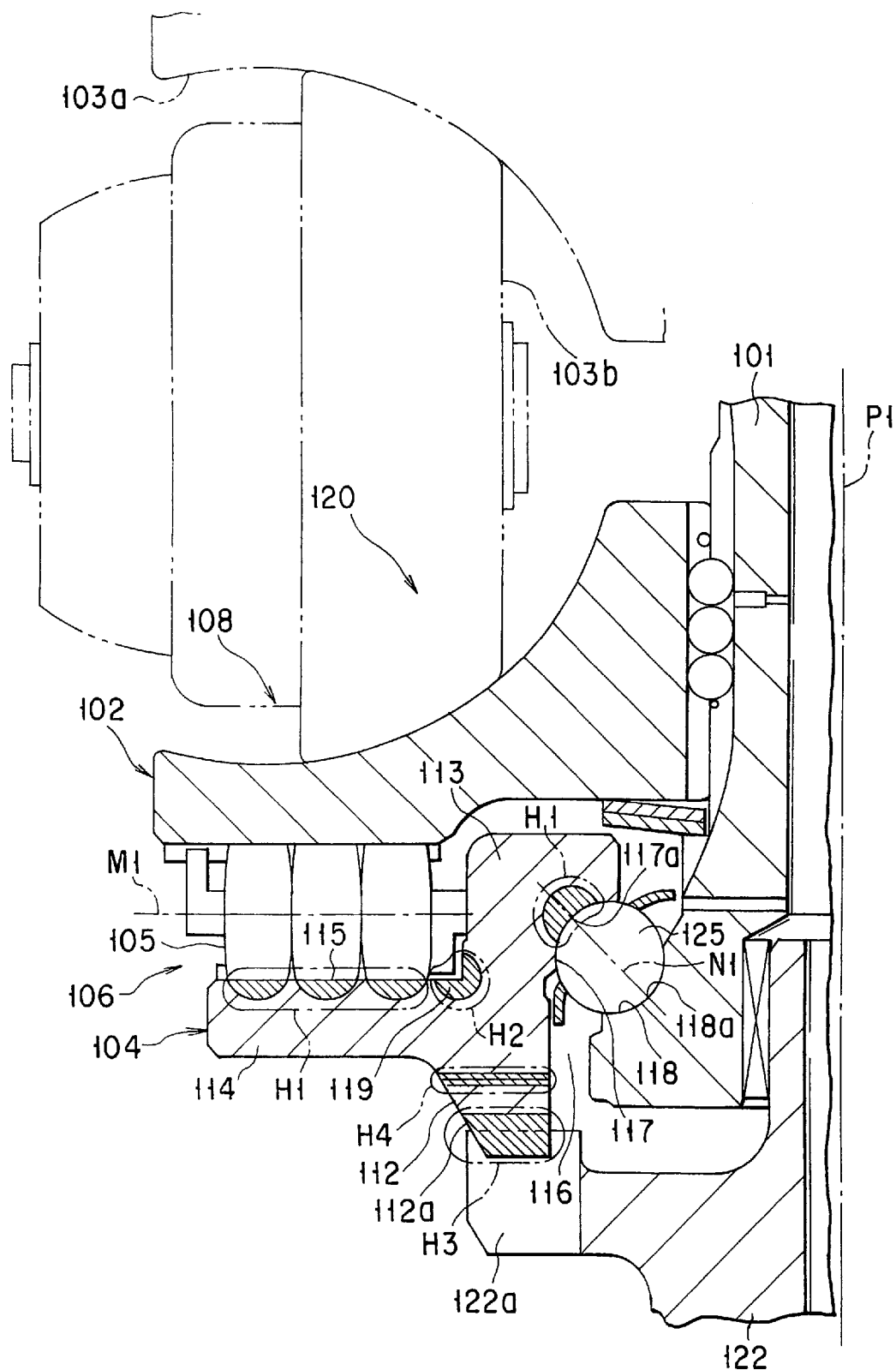
FIG. 14 is a cross-sectional view showing a part of a toroidal type continuously variable transmission having a conventional cam disk.
Figure 15:
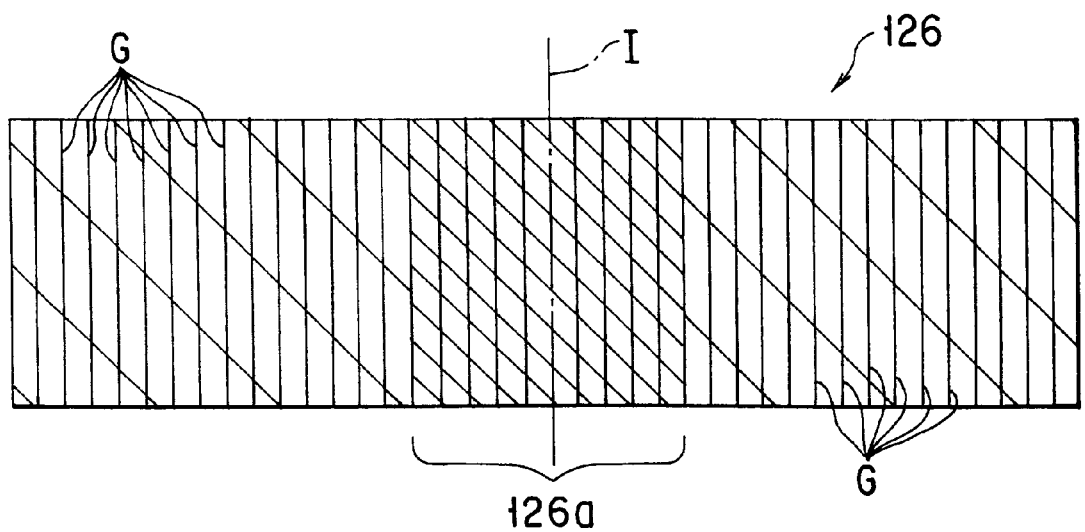
FIG. 15 is a cross-sectional view of material used for producing the conventional cam disk.
Figure 16:
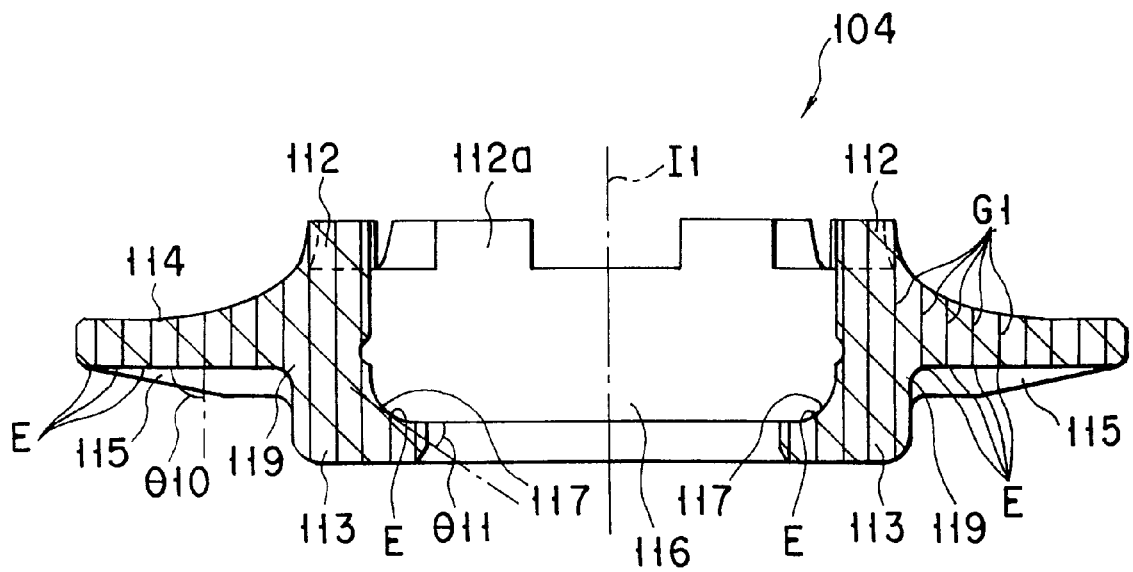
FIG. 16 is a cross-sectional view showing metal flows of the conventional cam disk.

To increase the durability, the cam disk 4 is devised as follows. As shown in FIGS. 5 and 13, oil holes 70 which allow passage of traction oil, serving as lubricant, are formed in the cam disk 4. The number of oil holes 70 is the same as that of the recess portions 15b of the cam surface 15. Outer ends 70a of the oil holes 70 are respectively opened on the positions corresponding to bottoms 15e of the recess portions 15b of the cam surface 15. Inner ends 70b of the oil holes 70 are opened near the raceway 17 of the cam disk 4. Thus, since the oil holes 70 are provided for the respective recess portions 15b of the cam surface 15, the traction oil can be sufficiently supplied to the loading cam mechanism 6. As a result, the durability of the cam surface 15 and the roller 5 can be improved. As shown in FIG. 13, a clearance groove 71 continuous in circumferential direction of the cam disk 4 is formed in the corner section 19 of the cam disk 4. The cam disk 4 is made of hard metal material, such as high-carbon chromium bearing steel or chromium-molybdenum steel.

The cam surface 15 and the raceway 17 are respectively in contact with the roller 5 and the ball 25 made of bearing steel or the like. Therefore, if the surface hardness of the cam surface 15 and the raceway 17 is low, these surfaces may be liable to wear or flake. To avoid this, in the cam disk 4 of this embodiment, the surface hardness of the cam surface 15 and the raceway 17 is at least HRc 58. Further, if the surface hardness of the clearance groove 71, formed in the corner section 19 where the second projecting portion 13 intersects the cam surface 15, is low, the corner section 19 may be broken by the tensile stress exerted on the clearance groove 71.

To avoid this, in the cam disk 4 of this embodiment, the surface hardness of the clearance groove 71 is also at least HRc 58. The internal hardness of the cam disk 4 is HRc 55 or lower. Further, the surface of the corner section 19, particularly the surface of the clearance groove 71, is subjected to shot-peening, thereby causing residual compressive stress to develop on the surface of the clearance groove 71. In the cam disk 4 having the above properties, the cam surface 15 and the surface of the raceway 17 do not easily wear or flake, and the rolling contact fatigue lifetime can be extended. Furthermore, since the surface hardness of the clearance groove 71 is HRc 58 or higher, the corner section 19 is not easily damaged. In this specification, HRc is a value of Rockwell hardness represented by the C scale. In the case of the C scale, a conical indenter made of diamond is pressed against the surface of a sample under a preparatory load of 10 kg and a test load of 150 kg for example. HRc is obtained on the basis of the depth of a recess formed in the surface of the sample.

If the internal hardness of the clearance groove 71 is as high as the surface hardness, HRc 58 or higher, the clearance groove 71 is liable to crack. As regards the cam surface 15 and the raceway 17 also, if the internal hardness is HRc 58 or higher like the surface hardness, the cam surface 15 and the raceway 17 are easily damaged due to insufficiency of tenacity. More specifically, if heat treatment called through hardening is performed wherein the overall cam disk is heated and then cooled rapidly, the hardness of the cam disk in its entirety can be increased. In this case, however, since not only the surface hardness but also the internal hardness of the cam disk is increased, the cam disk has insufficient tenacity and is therefore easily damaged. In contrast, the cam disk 4 of this embodiment has sufficient tenacity and is not easily damaged, since the internal hardness is HRc 55 or lower as described above.

The durability of the cam disk 4 can be further increased by shot-peening performed on the surface of the corner section 19, particularly, the surface of the clearance groove 71. The process of shot-peening the surface of the corner section 19 develops residual compressive stress on the surface of the clearance groove 71. Since the residual compressive stress compensates for the tensile stress developed in the clearance groove 71 when the toroidal type continuously variable transmission is driven, it is very effective for preventing damage such as a crack from occurring in the clearance groove 71.

Samples Nos. 1 to 12 indicated in the following Table 1 are subjected to an endurance test to investigate the effect of increasing the surface hardness of the cam surface 15, the raceway 17 and the clearance groove 71. Table 2 shows the results of the test. Further, samples Nos. 13 to 28 indicated in the following Table 3 are subjected to an endurance test to investigate the effect of shot-peening the clearance groove 71. Table 4 shows the results of the test. All materials (SUJ2, SCM435 and SCM420) indicated in Tables 1 to 4 are kinds of steel provided by the Japanese Industrial Standard (JIS).

TABLE 1

| Sample No. | Material | Heat Treatment |
|---|---|---|
| 1 | SUJ 2 | Through Hardening |
| 2 | SUJ 2 | Through Hardening |
| 3 | SUJ 2 | Through Hardening |
| 4 | SUJ 2 | Through Hardening |
| 5 | SCM 435 | Carbonitriding |
| 6 | SCM 435 | Carburizing |
| 7 | SCM 435 | Carburizing |
| 8 | SCM 435 | Carbonitriding |
| 9 | SCM 420 | Carbonitriding |
| 10 | SCM 420 | Carburizing |
| 11 | SCM 420 | Carburizing |
| 12 | SCM 420 | Carbonitriding |

TABLE 2

| | Surface hardness (HRc) | | Internal | |
|---|---|---|---|---|
| Sample No. | Cam surface & clearance groove | Race way | hardness (HRc) | Test results (○: OK, X: NG) |
| 1 | 61 | 62 | 60 | ○ |
| 2 | 59 | 60 | 57 | ○ |
| 3 | 57 | 58 | 55 | X |
| 4 | 59 | 57 | 56 | X |
| 5 | 59 | 59 | 45 | ○ |
| 6 | 60 | 61 | 49 | ○ |
| 7 | 57 | 58 | 46 | X |
| 8 | 58 | 57 | 47 | X |
| 9 | 60 | 60 | 44 | ○ |
| 10 | 59 | 59 | 42 | ○ |
| 11 | 56 | 57 | 40 | X |
| 12 | 58 | 57 | 41 | X |

TABLE 3

| Sample No. | Material | Heat treatment | Clearance groove |
|---|---|---|---|
| 13 | SUJ 2 | Through hardening | Not shot-peened |
| 14 | SUJ 2 | Through hardening | Not shot-peened |
| 15 | SUJ 2 | Through hardening | Shot-peened |
| 16 | SUJ 2 | Through hardening | Shot-peened |
| 17 | SUJ 2 | Through hardening | Not shot-peened |
| 18 | SUJ 2 | Through hardening | Shot-peened |
| 19 | SUJ 2 | Through hardening | Not shot-peened |
| 20 | SUJ 2 | Through hardening | Shot-peened |
| 21 | SCM 435 | Carbonitriding | Not shot-peened |
| 22 | SCM 435 | Carburizing | Not shot-peened |
| 23 | SCM 435 | Carburizing | Shot-peened |
| 24 | SCM 435 | Carbonitriding | Shot-peened |
| 25 | SCM 420 | Carbonitriding | Not shot-peened |
| 26 | SCM 420 | Carburizing | Not shot-peened |
| 27 | SCM 420 | Carburizing | Shot-peened |
| 28 | SCM 420 | Carbonitriding | Shot-peened |

TABLE 4

| | Surface hardness (HRc) | | Internal | |
|---|---|---|---|---|
| Sample No. | Cam surface & clearance groove | Race way | hardness (HRc) | Test results (○: OK, X: NG) |
| 13 | 61 | 62 | 60 | X |
| 14 | 61 | 60 | 59 | X |
| 15 | 59 | 60 | 59 | X |
| 16 | 62 | 58 | 56 | X |
| 17 | 56 | 57 | 56 | X |
| 18 | 57 | 58 | 56 | X |
| 19 | 52 | 51 | 50 | X |
| 20 | 51 | 51 | 49 | X |
| 21 | 59 | 61 | 51 | X |
| 22 | 60 | 61 | 54 | X |
| 23 | 59 | 58 | 49 | ○ |
| 24 | 62 | 62 | 54 | ○ |
| 25 | 60 | 61 | 48 | X |
| 26 | 59 | 59 | 42 | X |
| 27 | 59 | 59 | 43 | ○ |
| 28 | 62 | 61 | 45 | ○ |

The samples Nos. 1, 2, 5, 6, 9 and 10 indicated in Tables 1 and 2 withstood for 50 hours, the objective time of endurance. In contrast, in the sample No. 3, wear and flaking occurred in 28 hours in the cam surface 15 which is in contact with the roller 5, resulting in slip. In the sample No. 4, wear and flaking occurred in 37 hours in the raceway 17 which is in contact with the ball 25, resulting in slip. In the sample No. 7, wear and flaking occurred in 24 hours in the cam surface 15 which is in contact with the roller 5, resulting in slip. In the sample 8, wear and flaking occurred in 19 hours in the raceway 17 which is in contact with the ball 25, resulting in slip. In the sample No. 11, wear and flaking occurred in 21 hours in the cam surface 15 which is in contact with the roller 5 and in the raceway 17 which is in contact with the ball 25, resulting in slip. In the sample No. 12, wear and flaking occurred in 15 hours in the raceway 17 which is in contact with the ball 25, resulting in slip.

The sample s Nos. 23, 24, 27 and 28 indicated in Table 3 and 4 withstood for 200 hours, the objective time of endurance. In contrast, in the sample No. 13, the clearance groove 71 was broken in 34 hours. Similarly, the clearance groove 71 was broken in 31 hours in the sample No. 14, in 47 hours in the sample No. 15, in 62 hours in the sample No. 16, in 32 hours in the sample No. 17, in 51 hours in the sample No. 18, in 28 hours in the sample No. 19, in 45 hours in the sample No. 20, in 141 hours in the sample No. 21, in 158 hours in the sample 22, in 163 hours in the sample No. 25, and in 135 hours in the sample No. 26. Thus, these samples could not withstand the objective time of endurance, 200 hours.

It is understood from Table 2 that the wear resistance and flaking resistance of the cam surface 15, the raceway 17 and the clearance groove 71 can be improved by increasing the surface hardness thereof. It is confirmed from Table 4 that the cam disk becomes resistant to damage by lowering the internal hardness of the cam disk and shot-peening the surface of the clearance groove 71.

It is preferable that the cross section of the clearance groove 71 be an arc having a radius of curvature of 1 mm or more. With the clearance groove having such an arc-shaped cross section, the stress concentration in the clearance groove 71 can be relaxed. As a result, a crack is not liable to occur. For the same reason, it is preferable that the surface roughness of the clearance groove 71 be smoother than JIS25S (according to the Japanese Industrial Standard). Further, it is preferable that the diameter of a shot used in the process of shot-peening the clearance groove 71 be 1 mm or smaller.

To smooth the cam surface 15, the cam surface 15 may be polished, if necessary. To improve the durability and the power transmission efficiency of the loading cam mechanism 6, it is preferable that the projecting portions 15a and the recess portions 15b of the cam surface 15 be arranged at regular pitch in the circumferential direction of the disk 4 as accurately as possible. The projecting portions 15a and the recess portions 15b are required to extend accurately in radial directions from the center of the disk 4. The same applies to the cam surface 15c on the side of the input disk 2a, to which the cam surface 15 faces. As regards the raceway 18 of the input shaft 2 paired with the raceway 17, it is also preferable that the surface hardness be HRc 58 or higher and the internal hardness be HRc 55 or lower. The present invention is not limited to the toroidal type continuously variable transmission with double cavities described above, but can be applied in the same manner to a toroidal type continuously variable transmission with a single cavity.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cam disk for use in a toroidal type continuously variable transmission comprising an input disk and an output disk attached to an input shaft, and a pressing member, in contact with the input disk or the output disk, for pressing the input or output disk in a direction that the input and output disks get closer to each other, said cam disk comprising a cam surface, in contact with the pressing member, for pressing the pressing member against the input disk or the output disk, wherein the cam disk has metal flows in its inside along the cam surface.

2. A cam disk according to claim 1, wherein a first projecting portion projecting in a direction along an axis of the cam disk in a central portion thereof;

a second projecting portion projecting in a direction opposite to that of the first projecting portion along the axis;

a flange portion extending in radial directions of the cam disk from the first projecting portion and having the cam surface on which projecting portions and recess portions are arranged alternately in a circumferential direction;

a fitting hole extending through the first projecting portion and the second projecting portion along the axis of the cam disk; and a raceway formed in an inner circumferential surface of the fitting hole, to which a rolling element contacts, said cam disk has metal flows in its inside along a surface of the raceway which is brought into contact with the rolling element.

3. A cam disk according to claim 1, wherein a first projecting portion projecting in a direction along an axis of the cam disk in a central portion thereof;

a second projecting portion projecting in a direction opposite to that of the first projecting portion along the axis;

a flange portion extending in radial directions of the cam disk from the first projecting portion and having the cam surface on which projecting portions and recess portions are arranged alternately in a circumferential direction; and a fitting hole extending through the first projecting portion and the second projecting portion along the axis of the cam disk, said cam disk has metal flows in its inside along a surface of a corner section where the second projecting portion intersects the cam surface.

4. A cam disk for use in a toroidal type continuously variable transmission comprising an input disk and an output disk attached to an input shaft, and a pressing member, in contact with the input disk or the output disk, for pressing the input or output disk in a direction that the input and output disks get closer to each other, said cam disk comprising:

a cam surface, in contact with the pressing member, for pressing the pressing member against the input disk or the output disk;

a first projecting portion projecting in a direction along an axis of the cam disk in a central portion thereof;

a second projecting portion projecting in a direction opposite to that of the first projecting portion along the axis;

a flange portion extending in radial directions of the cam disk from the first projecting portion and having the cam surface on which projecting portions and recess portions are arranged alternately in a circumferential direction;

a fitting hole extending through the first projecting portion and the second projecting portion along the axis of the cam disk; and a raceway formed in an inner circumferential surface of the fitting hole, to which a rolling element contacts, said cam disk has, in its inside, metal flows along the cam surface, metal flows along a surface of the raceway which is brought into contact with the rolling element, and metal flows along a surface of a corner section where the second projecting portion intersects the cam surface.

5. A cam disk according to claim 4, wherein surface hardness of the cam surface, a surface of the raceway and a surface of the corner section is at least HRc 58 and internal hardness thereof is at most HRc 55.

6. A cam disk according to claim 5, wherein the corner section has a shot-peened surface to which residual compressive stress is applied.

* * * * *